United States Patent
Vanderbeken et al.

(10) Patent No.: US 11,389,992 B1
(45) Date of Patent: Jul. 19, 2022

(54) SMALL FOOTPRINT PRE-TREATMENT PLANT AND DECENTRALIZED FOOD WASTE SEPARATION AND TREATMENT

(71) Applicants: Olivier Hugo Christopher Dany Vanderbeken, Sudbury (CA); Marc Alphonse Vanderbeken, Quebec (CA); Cedric Jean-Luc Vanderbeken, Ixelles (BE)

(72) Inventors: Olivier Hugo Christopher Dany Vanderbeken, Sudbury (CA); Marc Alphonse Vanderbeken, Quebec (CA); Cedric Jean-Luc Vanderbeken, Ixelles (BE)

( * ) Notice: Subject to any disclaimer, the term of this patent is extended or adjusted under 35 U.S.C. 154(b) by 0 days.

(21) Appl. No.: 17/506,287

(22) Filed: Oct. 20, 2021

(51) Int. Cl.
 *B29B 17/02* (2006.01)
 *C02F 3/28* (2006.01)
 *C02F 11/04* (2006.01)
 *B29B 17/00* (2006.01)

(52) U.S. Cl.
 CPC .......... B29B 17/02 (2013.01); C02F 3/28 (2013.01); C02F 11/04 (2013.01); *B29B 2017/001* (2013.01); *B29B 2017/0224* (2013.01); *B29B 2017/0231* (2013.01); *B29B 2017/0286* (2013.01)

(58) Field of Classification Search
 CPC .......... B29B 17/02; B29B 2017/001; B29B 2017/0224; B29B 2017/0231; B29B 2017/0286; C02F 3/28; C02F 11/04
 USPC .......... 210/603, 252, 259, 260, 916; 209/3
 See application file for complete search history.

(56) References Cited

U.S. PATENT DOCUMENTS

| | | | |
|---|---|---|---|
| 5,497,871 A * | 3/1996 | Ciolkevich | B65G 47/1492 198/784 |
| 5,736,049 A * | 4/1998 | Bundy | C02F 3/14 210/241 |
| 6,254,776 B1 * | 7/2001 | Seagle | B01D 53/85 210/603 |
| 6,997,328 B2 | 2/2006 | Wilcher | |
| 10,260,764 B2 | 4/2019 | Deweerdt | |
| 10,898,907 B2 * | 1/2021 | Vanderbeken | B07B 1/185 |
| 10,899,564 B2 * | 1/2021 | Briddell | B65G 47/82 |
| 2004/0250670 A1 * | 12/2004 | Porter | B65B 69/0025 83/401 |
| 2009/0209025 A1 * | 8/2009 | Goschl | C12M 21/04 435/262.5 |
| 2015/0353435 A1 * | 12/2015 | Merrell | C05F 7/00 422/291 |
| 2016/0207806 A1 | 7/2016 | Oude Grotebevelsborg | |

(Continued)

*Primary Examiner* — Fred Prince

(57) ABSTRACT

The subject matter proposes an automated compact depackaging system. The depackaging system includes a receiving hopper, a vertical depackager, dumpsters and a sedimentation unit. The vertical depackager simultaneously removes and cleans packaging materials and the materials that exit the system are clean and organics free. The system also includes a dosing device for dosed discharge of waste or bulk material into the hopper. The hopper may also receive the organic wastes directly from trucks. The dosing device is fitted with metal to identify metals in the bulk material. The assembly includes a grabber on an overhead crane to pick up the metal piece once located. The hopper comprises air doors and air roofs to keep off from smell spreading into the room. The organics that are extracted from the waste are free of plastics and other packaging material.

13 Claims, 10 Drawing Sheets

(56) References Cited

U.S. PATENT DOCUMENTS

2019/0111440 A1\* 4/2019 Theodoulou .............. B03B 9/06
2021/0353794 A1\* 11/2021 Popa-Simil ............... A61L 9/14

\* cited by examiner

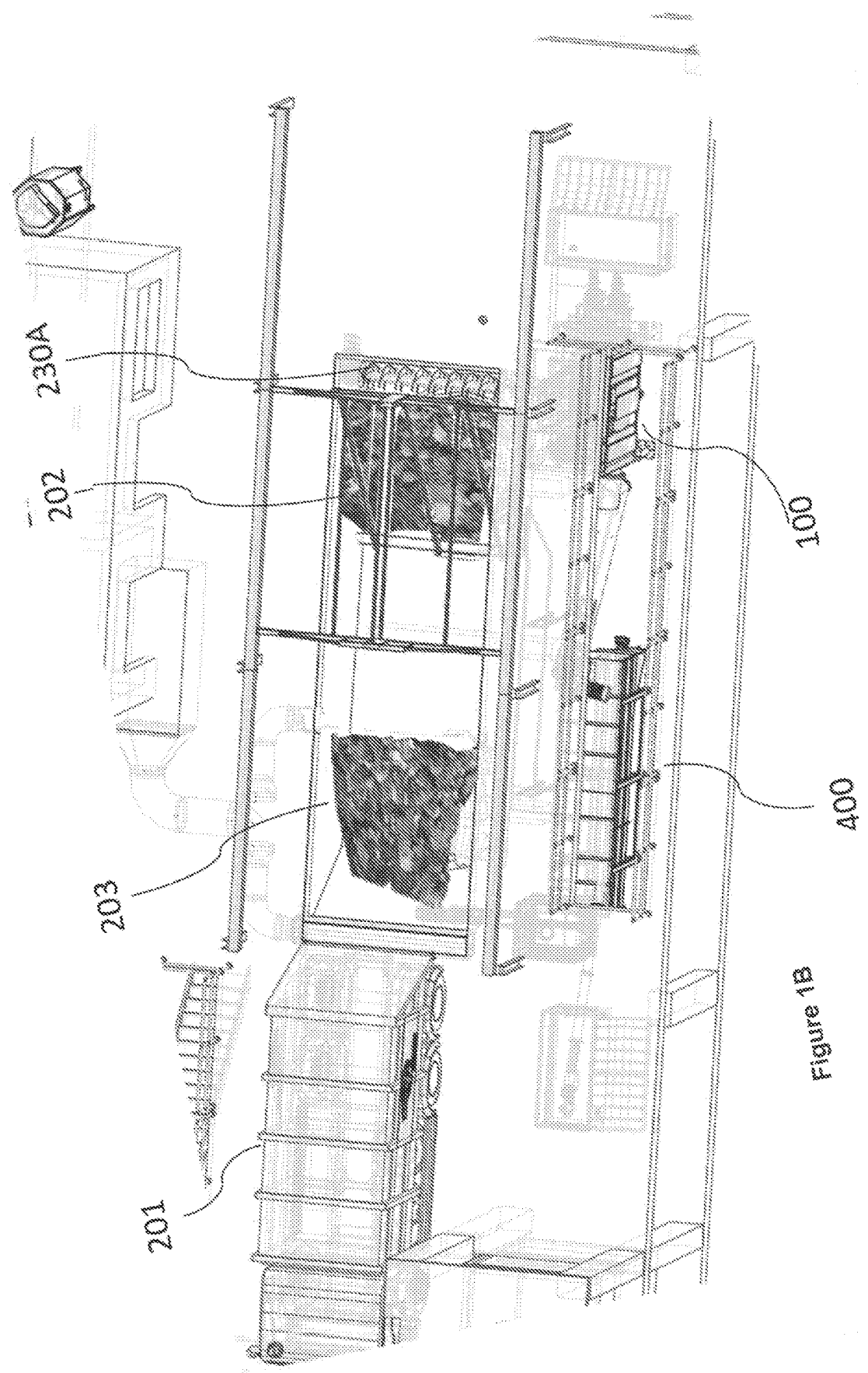

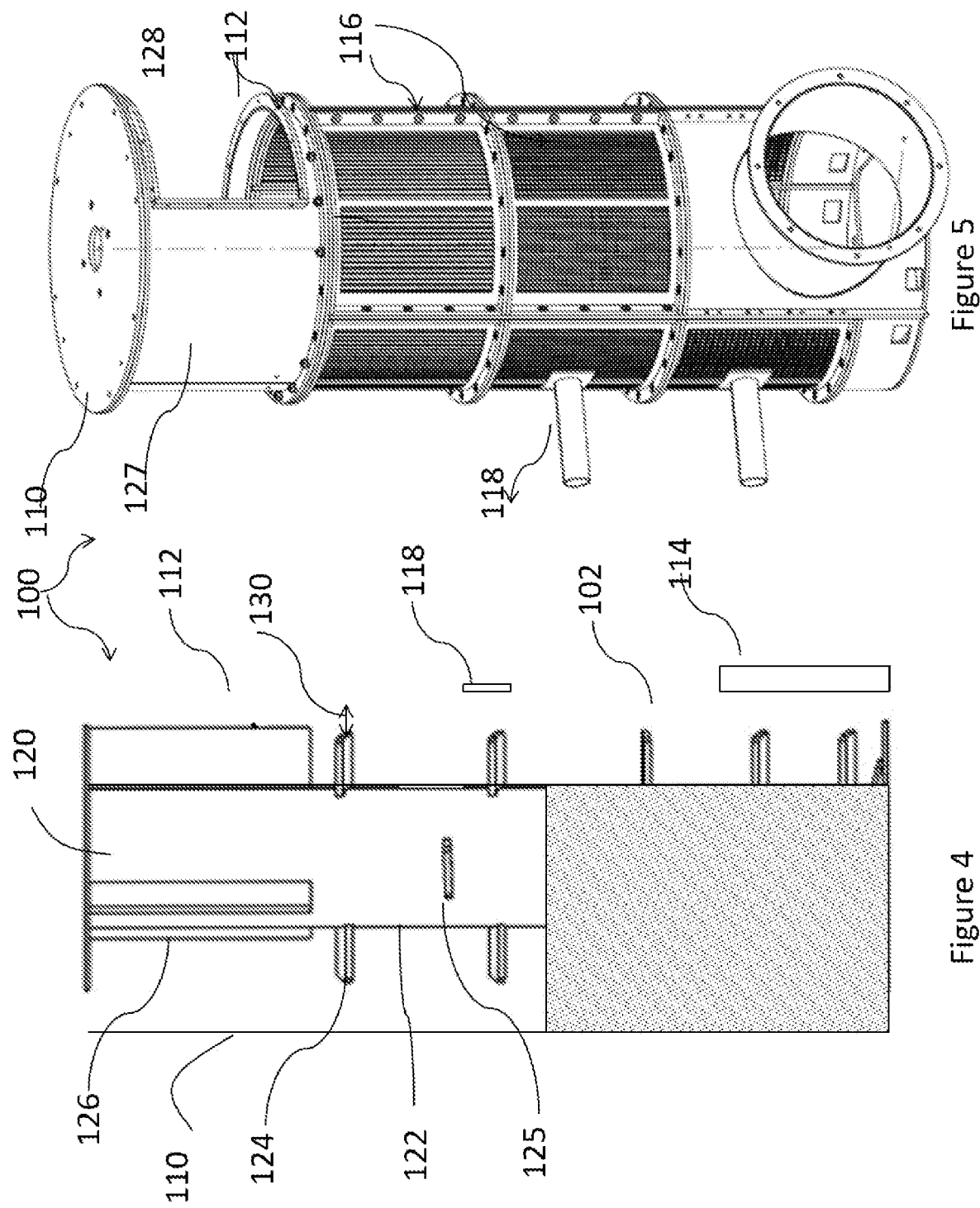

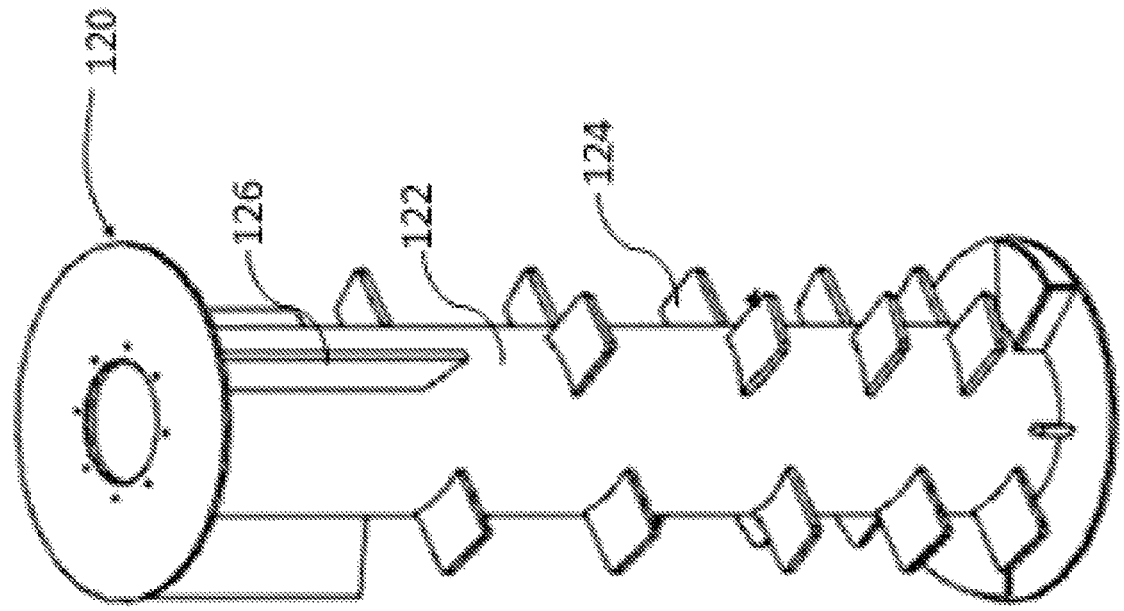
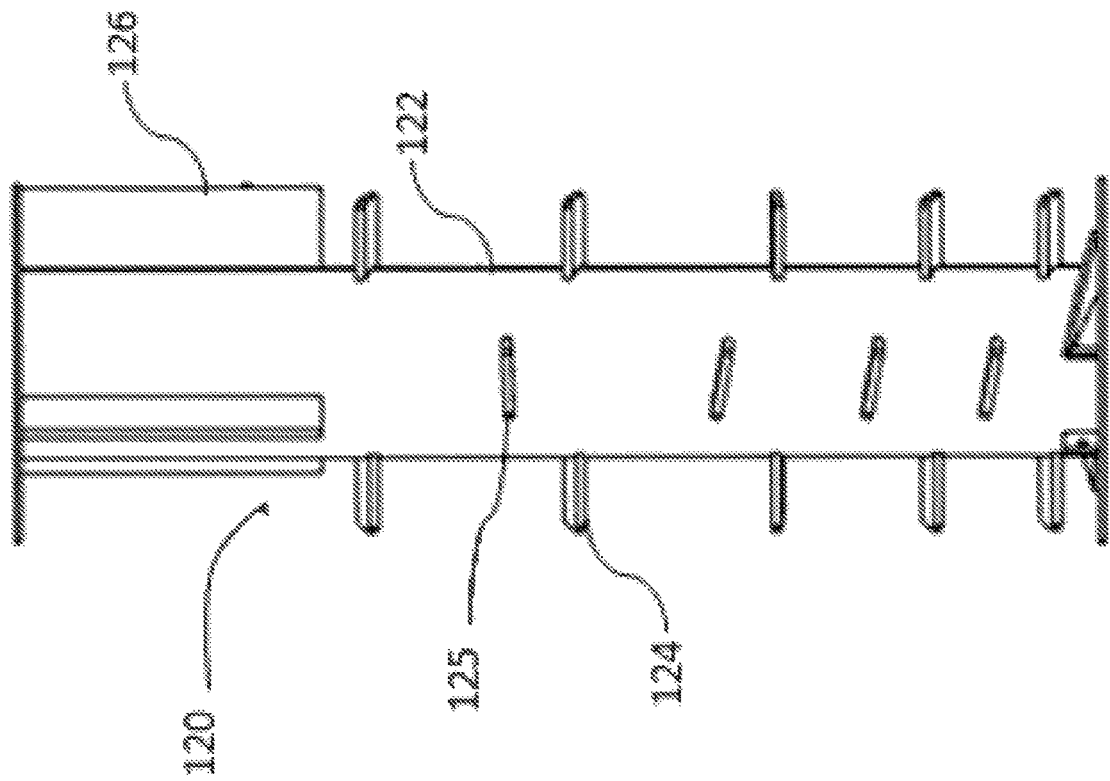
Figure 6B
Figure 6A

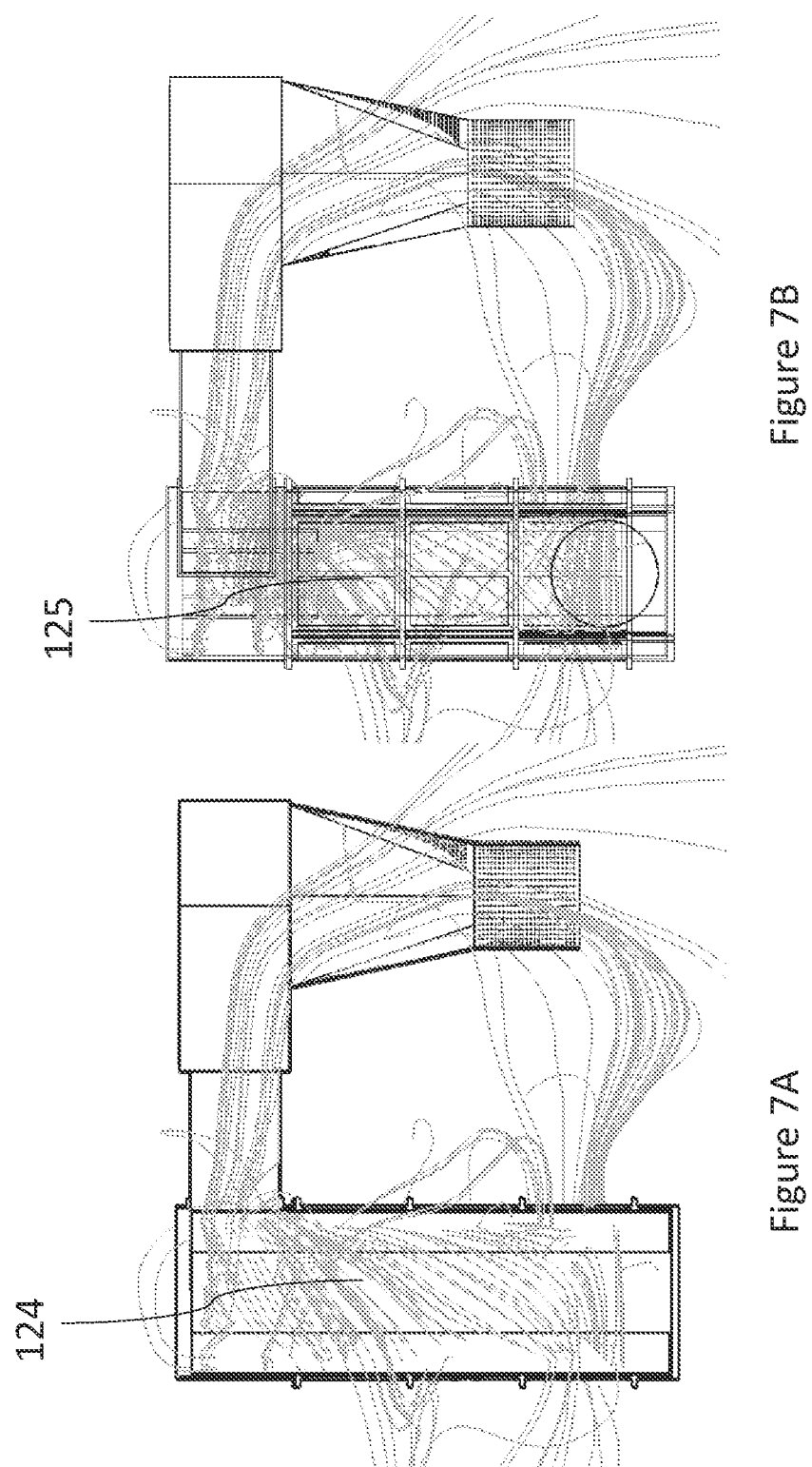

SMALL FOOTPRINT PRE-TREATMENT PLANT AND DECENTRALIZED FOOD WASTE SEPARATION AND TREATMENT

FIELD OF INVENTION

The disposal of food-waste (organic) materials that are combined with packaging materials or inorganics is a challenging process. The plastics and wrapping materials cause damage to the equipment designed to separate the useful organic fraction from the other waste streams. Depackaging systems separate packaging from food waste. The separated packaging often contains too many organics, so that the plastics and packaging cannot be recycled because they are too contaminated with these residual organics, and they end up in the landfill.

The present disclosure relates to a Small Footprint Pretreatment Plant and in particular to an automated compact plant that may remove metals and simultaneously remove and clean packaging, remove inorganics and residual plastics from a contaminated food waste stream prior to entering in a digester or discharge in the sewers or tanker truck, with the odors contained.

SUMMARY OF THE INVENTION

There is a need for a pre-treatment process that effectively removes the contaminants of food waste prior to further treatment. The present invention comprises a complete pre-treatment plant, offering a complete treatment from receiving the food waste to the production of a clean organic soup and organics free packaging. Conventional prior art systems do not offer a complete solution, whereby components of such arrangement either had to be invented or improvements had to be made.

The food waste is received in a hopper by unloading a collection truck in said hopper, and the food waste is introduced in a depackager with a dosing conveying system, located in the hopper. In some embodiments the hopper further includes an air roof, and a metal detection and contaminant extraction system.

The depackager includes a vertical depackaging apparatus that includes a plurality of bouncing plates placed perpendicular to a shaft along a circumference of the shaft, and two or more tall plates mounted perpendicular to the shaft at a top position. The vertical plates are configured to create a suction-like movement of the air from the surface of the mass to a top of the apparatus thereby providing a lift force to remove the light waste. A person familiar with the art would be able to create this suction effect with different methods. The bouncing plates create a chaotic movement and expel air and light waste from the mass in the air environment and to lift to a surface of the mass the light waste therewithin and the tall plates simultaneously create a centrifugal movement at a top level of the apparatus to expel the light waste through an exit passage for the light waste at a top portion of the apparatus and have a final cleaning of the packaging prior to exiting.

A sedimentation and floatings removal unit is operationally connected to the depackaging assembly. In various embodiments the sedimentation unit includes a longitudinal tank comprising a baffle plate configured to partly separate the tank into a first vessel and a second vessel, wherein the first and the second vessels are connected at the bottom through an opening, a rectangular opening with a sliding door at a side of the tank and above the ordinary liquid level configured to remove floating plastics, wherein the sedimentation unit processes and separates the soup into at least one of plastic waste, grit material and organic soup, wherein the plastic waste removed at the sedimentation unit is re-injected in the vertical depackager above the highest level of the inlet flange.

The compact plant is configured to separate organic and inorganic waste components. The apparatus includes a hopper, odour containment, a depackager, and a sedimentation and floatation unit that separates the inorganics from the organics.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles.

FIG. 1B illustrates a small footprint pre-treatment plant with the unloaded waste pile being destacked and moved to the feeding pile prior to being loaded on a feeding system in accordance with some embodiments of the present disclosure.

FIG. 4 shows a sketch of the interior of the depackaging unit in accordance with some embodiments of the present disclosure.

FIG. 5 shows the filtration drum of the depackaging unit in accordance with some embodiments of the present disclosure.

FIG. 6A illustrates a front view of the rotor and the attached bouncing plates in accordance with some embodiments of the present disclosure.

FIG. 6B illustrates a perspective view of the rotor and the attached bouncing plates in accordance with some embodiments of the present disclosure.

FIG. 7A shows the results of computational fluid dynamics model with all the bouncing plates at the same angle in accordance with some embodiments of the present disclosure.

FIG. 7B shows the results of computational fluid dynamics model with a bouncing plate at a different angle in accordance with some embodiments of the present disclosure.

DETAILED DESCRIPTION

Figure 1A:
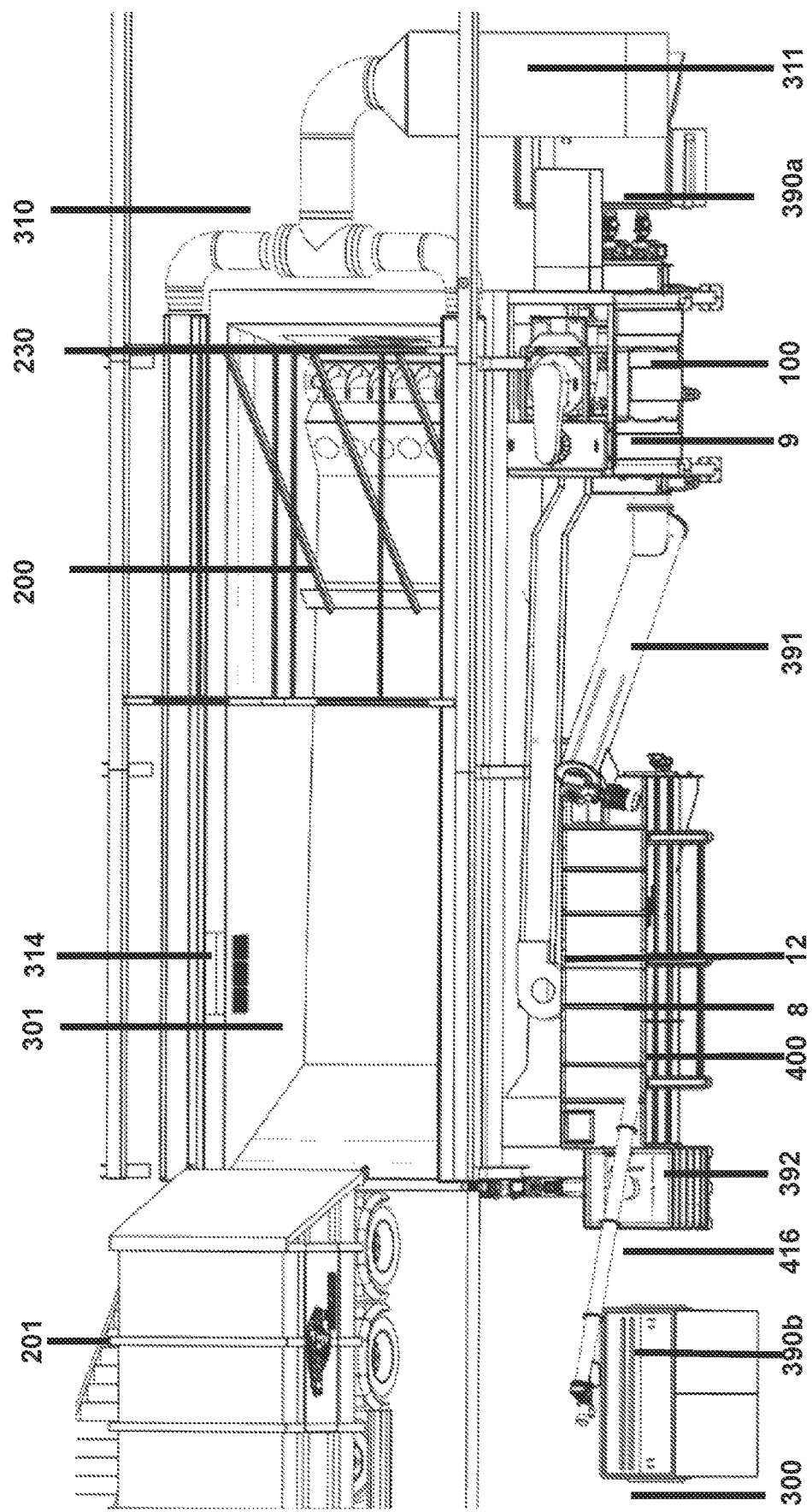
FIG. 1A illustrates a small footprint pre-treatment plant with its entire components in accordance with some embodiments of the present disclosure.

The disposal of food-waste materials that are combined with packaging materials and inorganics is a challenging process. Depackaging systems separate plastics and packaging from food waste. The plastic and wrapping materials that a depackager fails to remove often goes first in the digester and might end up on the land where the digestate is disposed. The separated plastics and packaging often contain too many organics, so that they cannot be recycled, and they end up in the landfill. Current food waste handling facilities typically require a lot of space to store the waste and are also often fitted with extensive air treatment system and/or are located outside of the city centres due to the creation of an odorous environment.

The separated plastics and packaging should be as clean as separately collected plastics and packaging in order to be discharged with the regular separated collection of paper, plastics and packaging. There is a need for cleaning the plastics and packaging sufficiently for them to be recycled rather than landfilled. The present invention accomplishes this cleaning through the act of tumbling and vibrating the plastics and packaging. The existing depackagers are unable to handle large plastic bags and require pre-processing in the form of debagging or shredding prior to depackaging. Often, the waste is conveyed to these depackagers through the use of a front loader or an overhead crane, and thus result in increased capital, maintenance, and labour costs. With all the additional equipment like shredder, debagger, and loaders, the existing depackaging systems require a lot of space. Additionally, the existing depackagers are often equipped with limited size hoppers and large air treatment system must be installed at the treatment plant, because of the odours generated from the waste stored on the warehouse floor.

There are devices available to build and be combined into a plant to depackage waste, but those devices do not fulfil the requirements that are essential to a cost effective, compact and efficient and economical pre-treatment plant and thus the components have to be improved or invented or a new function has to be added to these devices.

The present subject matter discloses a compact pre-treatment plant, a single general inventive concept. The pre-treatment plant includes a receiving hopper (301), a destacking and feeding system (200), a vertical depackager (100), one or more dumpsters (390) and some conveying or pumping devices (391) and (396) to bring the organic soup to a sedimentation and flotation unit (400), and a transfer device (392) to bring the cleaned soup to the digester, truck or sewers.

FIG. 1A and FIG. 1B illustrates an overall arrangement of a pre-treatment plant and all of its essential components. In an implementation, the compact pre-treatment plant may comprise, without limiting to, a receiving hopper (301) for receiving and/or collecting loads of organic waste from one or more transport vehicles (201), and the receiving hopper (301) might be equipped with an air roof (310) to control odours, a destacking and dosing system (200) along with a feeding system (230) to empty the hopper (301) and feed the depackager (100), a first dumpster (390*a*) to collect the separated plastics and packaging from the depackager (100), a sedimentation unit (400), a second dumpster (390*b*) to collect the grit, glass and sand removed from the sedimentation unit (400), a discharge device for the cleaned soup (392), and a transport system (396) to re-feed the scum and plastics to the depackager (100).

Present pre-treatment plants require a lot of air treatment to overcome the nuisance of the odours produced by the rotting organics. There is a need to contain those odours in a hopper to be able to build a small footprint pre-treatment plant.

The present disclosure addresses the problem of odours by installing an air roof (310) on top of the hopper (301) and allowing for maintenance and visual inspection from the top as shown in FIG. 1A. Odour is contained and is thus not distributed in the building reducing the load on the air treatment system. The excess air pressure created in the odorous hopper (301) is partially released through the inlet of the depackager (100). Some of the odours in the air inside the hopper (301) may be reduced by being scrubbed by a dilution liquid added to the feed stock above the feeding screw (230), and the remainder may be removed through an exhaust (314) of the hopper (301).

Present pre-treatment plants require a lot of air treatment to overcome the nuisance of the odours produced by the rotting organics. There is a need to contain those odours in the hopper (301) to be able to build a small footprint pre-treatment plant.

Figure 3A:
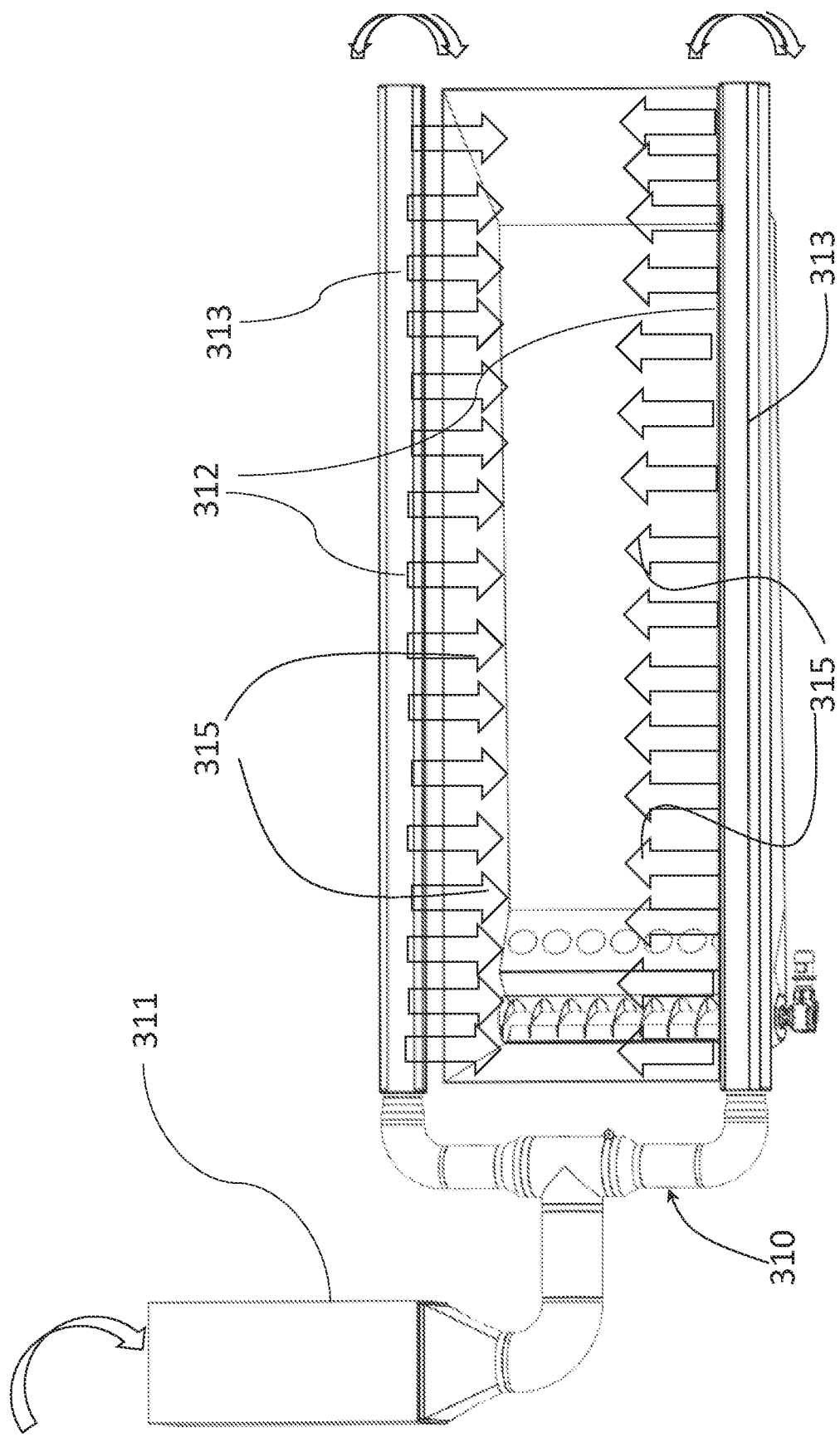
FIG. 3A shows a sketch of the aerial view of the air roof in accordance with some embodiments of the present disclosure.

The present disclosure addresses the problem of odours by installing an air roof (310) on top of the hopper (301) and allowing for maintenance and visual inspection from the top as shown in FIG. 3A without being exposed to the odours. A roof of air is created through the use air current tubes (313) extending along the tops of the sidewalls of the hopper (301) on opposite sides thereof in which the air is generated by a blower (311) and released into the hopper (301) by opposing air nozzles (312) extending from the air current tubes (313). Odour is contained and is thus not distributed in the building reducing the load on the air treatment system. The excess air pressure created in the odorous hopper (301) is partially released through the inlet of the depackager (100) and part of the odours in the air are reduced by being scrubbed by a dilution liquid, while the other part is removed through the exhaust (314) of the hopper (301).

Deweerdt teaches a similar device in U.S. Pat. No. 10,260,764 that is used for generating an air wall across a passage opening, which passage opening has lateral edges and a top edge comprising: a first and second blowing device, arranged at the lateral edges in such a way that planar air streams are blown over the height and respective parts of the width of the passage opening.

Wiemann teaches a similar device in EP1342959B2 that is used for allowing a truck to enter an odorous building or bunker without having any odours leave the building, while Wiemann teaches that the truck is entering through the air door. In the present invention, only the waste enters through the air roof (310) and the smell is contained in the hopper (301) inside the building.

Deweerdt nor Wiemann do not teach us about the use of the system for air treatment purposes. In this invention the intake of the blower (311) is located inside the building while the exhaust (314) of the hopper (301) is fed directly to bio filters. This air roof system (310) effectively replaces or reduces the size of an HVAC system while preventing the odours of the decomposing waste to enter the building, and thus complements the HVAC system.

Deweerdt nor Wiemann do not teach us about such device being installed horizontally. Wherein there is no top edge, and the air streams are blown over the horizontal length. Deweerdt describes a planar air stream that is blown over the entire height and blowing directions that can vary over the height. The unexpected benefits of installing the device horizontally include the creation of a see-through roof and allows for visual inspection of the feed stock for undesirable contaminants.

The invention allows for product to be dumped and removed through said air roof (310).

The invention allows for visual inspection of the contents of the hopper (301) without entering the hopper (301) or being exposed to the odours.

The invention allows for essential repairs for objects that have be removed vertically through the air roof (310).

Several others teach us about air curtains, but these air curtains work only between areas of different temperatures and thus are not effective for odour control.

Figure 3B:
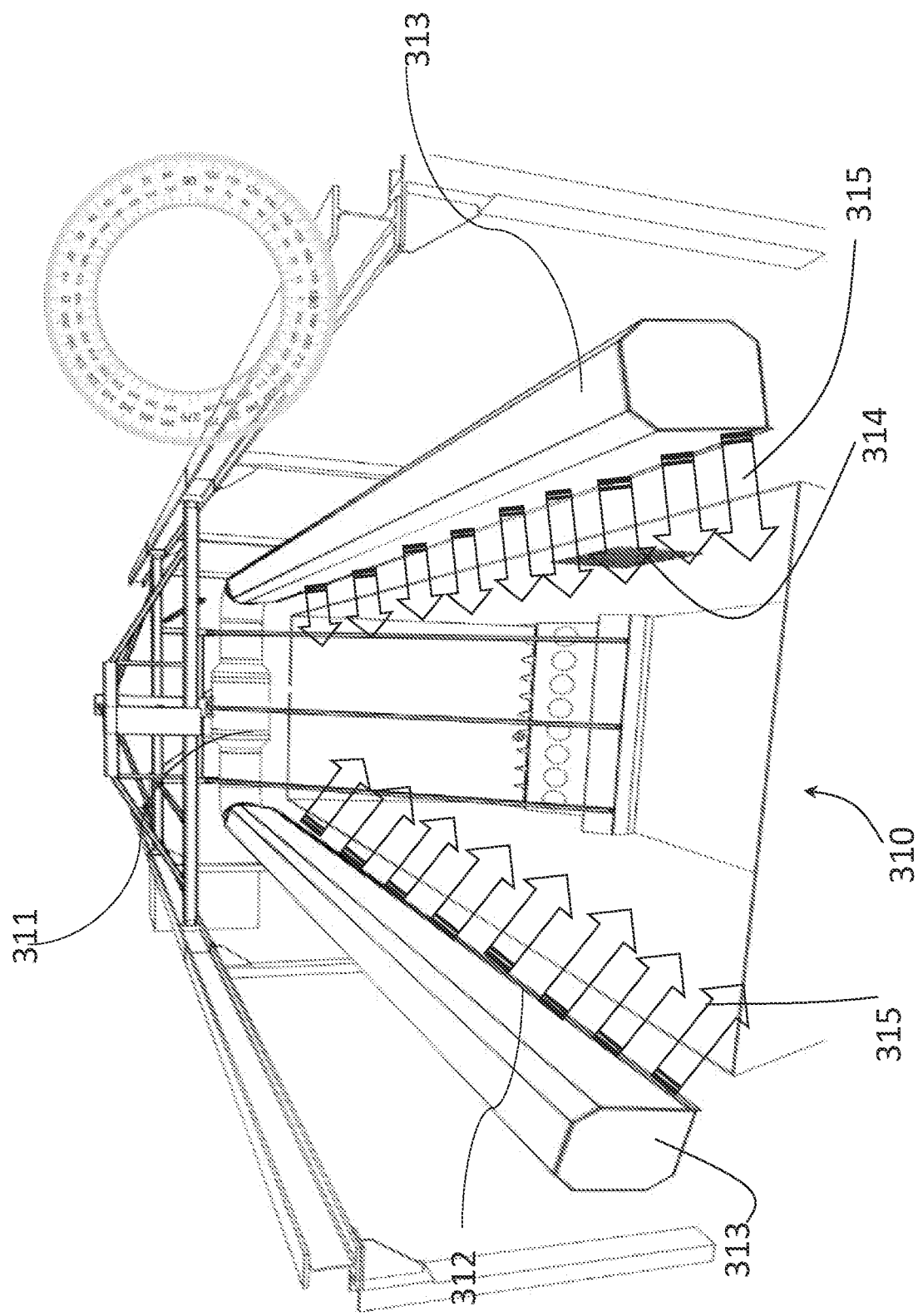
FIG. 3B shows a sketch of the face view of the air roof in accordance with some embodiments of the present disclosure.

The air roof (310) comprised of a blower (311), one or more air nozzle assemblies (312) positioned with outlets facing in the direction of the opening such that core air jets (315) flowing out of the core air nozzles (312) are directed into the hopper (301) through the air current tubes (313) in one or more directions at an angle between 90° and 140° and 270° and 220° respectively as displayed in FIG. 3B.

In many embodiments the air roof (310) is configured to block odour released from the hopper (301) during discharge of the bulk material mass (203) from a mass carrier device (201), as well as during the loading and handling of the bulk material mass (202) in a depackager (100), wherein a top opening of the hopper (301) comprises dimensions that facilitate visual inspection of the bulk material mass (203) and (202) in the hopper (301).

The second device required for the pre-treatment plant is the food waste hopper (301) and the destacking and dosing system (200). An energy and space efficient destacking and dosing system (200) and storage hopper (301) may be important to the compact pre-treatment plant. Present depackagers generally have a hopper capacity between 3 and 6 cubic meters and the continuous reception and processing of food waste requires a dedicated operator to continuously fill these hoppers, or a complicated combination of conveyors and other hoppers that all require maintenance and electricity.

Also, most of the depackaging systems available require human intervention to a large extent which is not effective. Another issue with current systems is that the operators must unstack all the waste and inspect it for metals to sending the waste to the depackager. If metals are not removed prior to sending the waste material into the depackager, the metal may cause severe damage to the depackager. The destacking and checking process is time consuming and imperfect since it relies on human detection. There are other techniques available to remove the metals but require close contact with the waste and the systems are expensive.

The loading device described in EP 0 882 390 B1 by Van Kempen does not describe the destacking of a load of material that is deposited in the bunker by a truck, a front loader or a forklift. Van Kempen only describes a dumping and dosing device. The device described in EP 0 882 390 is also missing a component that is essential for food waste pre-treatment plant which is the metal detection that can cause major damage to the depackager. For clarity FIG. 1 of Van Kempen has been adapted to FIG. 2.

The invention relates to an apparatus for destacking and dosing a pile of loose material (203) that has been discharged in the longitudinal hopper (301) by unloading a truck (201) at the input opening of the hopper (301) and destacking the pile of material (203) by means of a scraper (216) and depositing layer by layer on one or more new piles (202) in the hopper (301).

After moving the material (203) to the opposite side of the hopper (301), the material (202) is moved over a ramp (226) onto the feeding system (230), for instance a belt or screw conveyor, that is positioned perpendicular to the longitude of the hopper (301) in order to discharge the hopper (301) and to transfer the material (202) for further processing.

In an embodiment, the feeding system (230) can be emptying the hopper (301) and feeding the depackager (100) at the same time.

Under or in the ramp (226) one or more metal detectors (227) may be installed that are configured to detect metal items within the waste material (202) while the waste material (202) is being moved over the ramp (226) prior to loading onto the feeding system (230). Depending on the detector (227) that locates the contaminating piece of metal, the position of said metal is now determined and the contaminant can be removed prior to entry in the feeding system (230) and consequently in the depackager (100). The ramp (226) enables the layer of the waste material (202) passing over the ramp (226) to become increasing thinner to ensure that any metal items are detected by the metal detectors (227), and subsequently separated out of the waste material (202).

Present pre-treatment systems require other than the power consumed by the depackager, significant installed power for bag openers, shredders, screens, conveyors etc. Present destacking and loading device, from hereon called Waste Rover (200), only consumes 0.4 kW/hr of energy per tonne of food waste transported. To process 10 tonnes per hour the Waste Rover requires 4 kW/hr of energy while a front loader for loading the hopper (301) of a depackager consumes 10-15 litres of fuel per hour and needs maintenance as well as a full-time operator.

Figure 2:
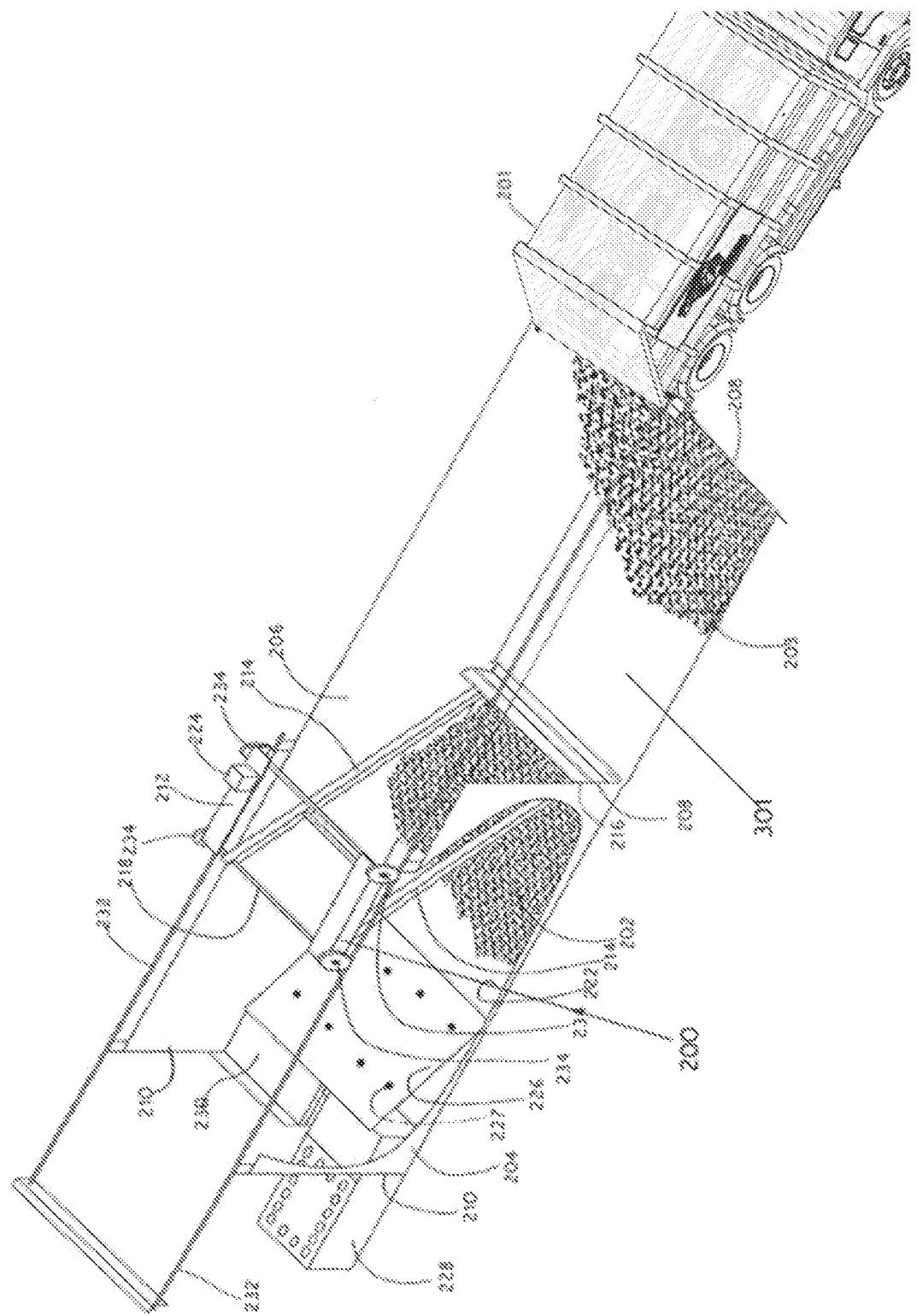
FIG. 2 shows the components of the hopper with a feeding system in accordance with some embodiments of the present disclosure.

In various embodiments the destacking and dosing system (200) for the discharged bulk material mass or waste (203) is disclosed as shown in FIG. 2. The destacking and dosing device (200) includes the storage hopper (301) shown in FIG. 1A and a carriage (212). The storage hopper (301) includes at least two parallel opposite walls (204), (206), the walls (204), (206) having an inner end (208), where (208) is sloped for easier discharge by the truck (201) and outer end (210) and a floor (222). Two openings, an infeed opening and outfeed opening between the corresponding outer ends of these walls (204), (206) are configured to receive the mass or food waste (202) and (203). The food waste (203) is received by dumping a truck (201) between the walls (204), (206) at the infeed opening (208). The carriage (212) moves along the upper side of the walls (204), (206) and includes at least one gripper arm (214) extending therefrom, provided at the outer free end with a gripper element (216). The carriage (212) is suspended pivotally at one end round a pivot shaft (218) extending transversely of the walls (204), (206). The gripper element (216) is displaceable controllably in a vertical direction, and the carriage (212) is displaceable over a distance and the gripper arm (214) has a length such that the gripper element (216) is displaceable over the entire length of the space bounded by the walls (204), (206).

In some embodiments metal detectors (227) are installed under the ramp (226) and configured to detect metals present in the mass (202).

The floor (222) of the hopper (301) may be built with a slope to allow for the collection of the liquids through a drain and into a collection tank.

Patent EP0882390, Dosing device for potting soil describes a dosing device (200) for dosed discharge of a bulk material mass from a storage container which comprises at least two parallel opposite walls (204) and (206) and wherein an infeed opening and outfeed opening are respectively provided between the corresponding outer ends of these walls for receiving this mass between these walls and the infeed and outfeed openings, comprising a carriage (212) displaceable along the upper side of said walls, on which carriage at least one gripper arm (214) is suspended pivotally at one end round a pivot shaft extending transversely of the walls, which gripper arm is provided at the other end with a gripper element (216), wherein the gripper element (216) is displaceable controllably or freely as desired in vertical direction, and the carriage (212) is displaceable over a distance and the gripper arm (214) has a length such that the gripper element (216) is displaceable over the entire length of the space bounded by the walls (204) and (206).

In one embodiment the hopper (301) for treatment or recycling of waste or for collection or dumping of waste, is disclosed. The hopper (301) includes one or more air roof assemblies (310) and allows a truck (201) to directly dump through the roof assemblies (310) in the hopper (301). Trucks (201) that unload on a flat surface cannot discharge at once and must spread the waste while unloading. By discharging directly into the hopper (301), warehouse space requirement is reduced since it eliminates the need of stacking waste in the warehouse prior to feeding the waste to the small hopper used by present depackagers. It also reduces air treatment cost by storing the waste in a small, contained environment.

In one aspect the hopper (301) for treatment or recycling of waste or for collection or dumping of waste, is disclosed. The top part of the hopper (301) includes an enclosure and a system for shielding of inner and outer ends (208) and (210). Van Kempen does not disclose such a device. The waste (203) must be driven in the hopper and discharged by a truck after entering the hopper. Van Kempen also does not teach us about having a truck dumping while simultaneously emptying the hopper. The hopper (301) in this invention is extended to allow for a dumping area and a dosing area. The gripper element (216) may be programmed to stay in the dosing area and move waste (202) to the conveyor (230) while the truck is unloading waste (203) in the dumping area. In order to bring the waste to the depackager, the stacking pile (203) created by the dumping of the truck (201) is gradually transported to the dosing pile when the truck (201) is done unloading. However. the prior art mentioned does not teach us about the use of similar continuous feeding system in a hopper.

The Waste Rover may be important to the compact pre-treatment plant because of the space and energy savings and also includes the metal detector (227) to protect the depackager (100).

In various aspects a vertical depackaging apparatus (100) for simultaneously removing and cleaning light waste from contaminated food waste (102) as shown in FIG. 4 is disclosed. The simultaneous removing and cleaning are attributed to the tumbling and bouncing of the separated packaging material from the contaminated food waste (102) at a sufficient speed prior to being ejected from the depackager (100). The food waste (102) is originating from SSO, restaurant waste or ICI. The food waste (102) includes organic waste, packaging, light waste, liquids and air. The depackaging apparatus (100) includes a stator assembly (110) and a rotor assembly (120) placed concentric with the stator assembly (110). The stator assembly (110) as shown in FIG. 5 includes a filtration drum (112) to hold the contaminated food waste. In various embodiments the filtration drum (112) is perforated and is composed of a plurality of individual panels (116).

In various embodiments an intake flange (114) is attached at a bottom position of the filtration drum (112). The intake flange (114) is configured to feed the food waste (102) or the organic waste to the filtration drum (112). The intake flange (114) receives the organic waste from the conveying system (230) which empties the hopper (301) and feeds the depackager (100) in the same operation. In various embodiments the apparatus (100) includes a feed opening (118) in a surface of the filtration drum (112). Waste materials are fed directly into the filtration drum (112) through the feed opening (118).

In various embodiments the scum and plastics recovered from the sedimentation unit (400) is transported (396) to the depackager (100) entering the depackager (100) at the feed opening (118) where the suction force is stronger than where the plastics typically enter (114), allowing for the smaller plastics to be separated by the upward suction and allowing the organics to fall into the viscous mass of food waste. This increases the overall plastics removal efficiency while forcing the waste stream of scum and floating plastics of the sedimentation unit to be separated. By re-introducing the stream of floating plastics and scum in the feed opening (118) the cleaning of the soup contaminated by plastics is complete. The plastics are recovered together with the packaging through the top of the depackager (128) while the scum is being re-processed by mixing said scum with the organics at the bottom of the depackager (102).

In various embodiments a dilution liquid may be added to a point of entry, e.g. at (114) or in the hopper above the screw conveyor (230A) to achieve a specific outlet consistency.

In various embodiments the rotor assembly (120) as shown in FIGS. 6A and 6B includes a central rotating shaft (122). A plurality of bouncing plates (124) is placed perpendicular to the shaft (122) around a circumference and along the length of the shaft (122). In various embodiments each bouncing plate (124) has an angle of inclination in the range of −5 to +25 degrees with respect to a surface of the shaft (122) and is configured to expel air and light waste from the food waste (102) and the depackager (100).

In various embodiments the plurality of bouncing plates (124) is placed in a helical upwards path along the circumference of the shaft (122). In various embodiments an arc of the plurality of bouncing plates (124) is in a range of 8 to 40 degrees. The bouncing plates (124) help moving the packaging and plastics in the contaminated liquid to the top of the liquid while the heavy waste and organics settle at the bottom of the filtration drum. The helical path is characterised with an increased pitch on its upwards path, the increased pitch reduces the concentration of bouncing plates (124) which facilitates the removal of plastics and packaging from depackager by reducing the amount of resistance encumbered on the upward trajectory.

The rotor assembly (120) may further include two or more vertical plates (126) extending perpendicular to the shaft (122) and mounted at a top position thereof In various embodiments the two or more vertical plates (126) spaced apart around the circumference of the shaft (122) are configured to create a suction force to lift the plastics and packaging upwards once it has left the liquid mixture. Bouncing plates (124) positioned below the higher level of the flange (114) facilitate the exiting of the plastics and packaging upwards out of the viscous mass of food waste at the bottom of the depackager by stirring. The stirring moves the lighter parts to the inner portion of the viscous mass and allow for the packaging to be sucked out of said mixture. The spinning of the vertical plates (126) develops a force that sucks the packaging or plastics upwardly while the bouncing plates (124) interact in this movement and thus create a chaotic movement in the depackager (100). The water, food waste and other heavy contaminants, sand, grit, and oil are expelled through the screen of the filtration drum (112).

In various embodiments the two or more vertical plates (126) are configured to create a suction force from the surface of the food waste to the top of the apparatus thereby providing a lift force to expel the light waste. The lift force is illustrated in FIG. 7A shows clearly how the air in the bottom part of the filtration drum (112) is rotating horizontal. Above the food waste feeding level, the air moves in a helical motion, going with a steep angle up. This is due to the pressure difference created by expelling air and light waste outside. Therefore, air inside the filtration drum (112) is sucked upwards towards the rotating vertical plates (126) and following a helical movement, it also shows the role of the plates (124) in keeping the plastics longer inside the filtration drum (112).

In various embodiments to create enough suction force the length of the vertical plates (126) are designed to be at a minimum 12% of the height the rotor (120), whereas the width of the vertical plates (126) extends as close as possible to the inner top part of the filtration drum (112) that may be closed or include small holes (127), whereby the separated plastics and packaging waste may be projected out of the exit passage (128).

In various embodiments the vertical plates (126) are perpendicular to the rotor (122) plus or minus 10 degrees.

In several aspects the rotor assembly (120) is placed concentric with the stator (110) and is configured to rotate at a predetermined speed. In various embodiments the apparatus (100) comprises a predetermined clearance gap (130) between the plurality of bouncing plates (124) and the filtration drum (112). A sufficient clearance gap (130) is required in order to limit the tearing of the packaging and avoid the creation of micro-plastics in the depackaging process. The predetermined clearance gap (130) between the bouncing plates (124) and the filtration drum (112) is in a range of 1 cm to 6 cm. Present depackagers often operate on the principle of centrifugation which requires the minimum technical possible clearance between the paddles of said devices and their filtration drum resulting in shredding of the packaging and the creation of micro-plastics. Packaging and organics are projected by force against the filtration drum (112) and are scraped off the filtration drum (112) and scraped off while the packaging is squeezed upwards. The arrangement of the bouncing plates (124) on the rotor (120) and the clearance gap between the filtration drum (112) provide a tumbling and bouncing effect on the separated plastics from the contaminated liquid when the rotor (120) is rotated at a predetermined speed. Also, this arrangement allows the plastics and packaging to stay in the apparatus for a prolonged tumbling time. The increase in residence time increases the removal efficiency of the organics from the plastics and packaging.

Adjustments can be made to the size or angle of one or more of the bouncing plates (124). The change of angle can disturb the helical path of the light materials to ensure proper tearing of the packaging in applications where packaging is difficult to open for example recyclable coffee pods. FIG. 7A displays a CFD with all the bouncing plates (124) at the same angle while FIG. 7B displays a CFD with some of the bouncing plates (125) at a different angle than the other bouncing plates (124). This creates a collision of the packaging with the bouncing plate (125) forcing items that normally would continue their path upwards to collide and force a packaging to open by force. It is clear from the figures that the change of angle creates an increase in turbulence in the depackager (100) and increase the number of collisions between the waste (102) and the bouncing plates (124).

In various embodiments the apparatus (100) comprises an exit passage (128) for the light waste at the top portion of the apparatus (100). In various embodiments the apparatus (100) is connected to the receiving hopper (390*b*) to collect the light waste.

In various embodiments the apparatus (100) comprises an exit passage for the screened material where a collection bin, a feeding screw (391) or a pump mechanism may be installed.

In various embodiments the bouncing plates (124) have a cleaning effect without shredding the material which is being cleaned.

The vertical depackager's (100) top section contains vertical plates (126) that create the suction force, where the upper part of the filtration drum (112) is solid or ideally is composed of an undulated fine wire mesh screen. At this position the chaos created by the bouncing plates (124) is transitioning into a centrifugal movement. The fast speed of the vertical plates (126) interacting with the undulation of the screen (127) creates a strong vibration force that further releases the residual moisture, organic or grease to be expelled from the light waste.

The depackager (100) is important to the plant not only because it produces clean plastics and packaging that can be recycled but also because it can reprocess the plastics and the scum that is removed by the sedimentation unit (400).

The pre-treatment plant must be able to remove grit, sand, and plastic from the organics to achieve a quality product. Thus, the sedimentation unit (400) with scum and remaining plastics removal after the depackager (100) is essential to the process.

An existing mechanism disclosed in WO2021014353A1 suggests an apparatus for separating fractions of contaminant from a liquid flow comprising a heterogeneous mixture, it comprises dispensing means of a fluid which are arranged so as to dispense a fluid into the second volume and to set off, during the use of the separation apparatus, a plurality of motions thus determining in the second volume the floating of the first fraction of contaminant and the settling of the second fraction of contaminant; a first plurality of scrapers and a second plurality of scrapers to draw the first fraction of contaminant towards the first outlet.

Yet another existing mechanism discussed in EP2929942B1 suggests removal of floatables and scum at or near an entrance to the water treatment system.

Document U.S. Pat. No. 6,997,328B2 discloses an assembly for removing grit from a fluid comprising a tank with a fluid inlet into the tank and a discharge from the tank.

However, none of the existing mechanisms completely prevent plastics from getting into the digester and ultimately being disposed onto the land. Also, most of the existing mechanisms require costly maintenance and/or are driven by electrical motors that consume a lot of energy. Thus, there is need for an efficient and economical solution for separating different types of contaminants, and particularly plastics, from the corresponding organic fractions. It is an objective of the present invention to mitigate, alleviate or eliminate one or more of the above-identified deficiencies and disadvantages in the existing solutions and solve at least the above-mentioned problems.

The proposed apparatus aims to remove plastics and/or other light weight contaminants such as wood, from the fluid/liquid stream entering the separation tank in the simplest economical manner.

Figure 8A:
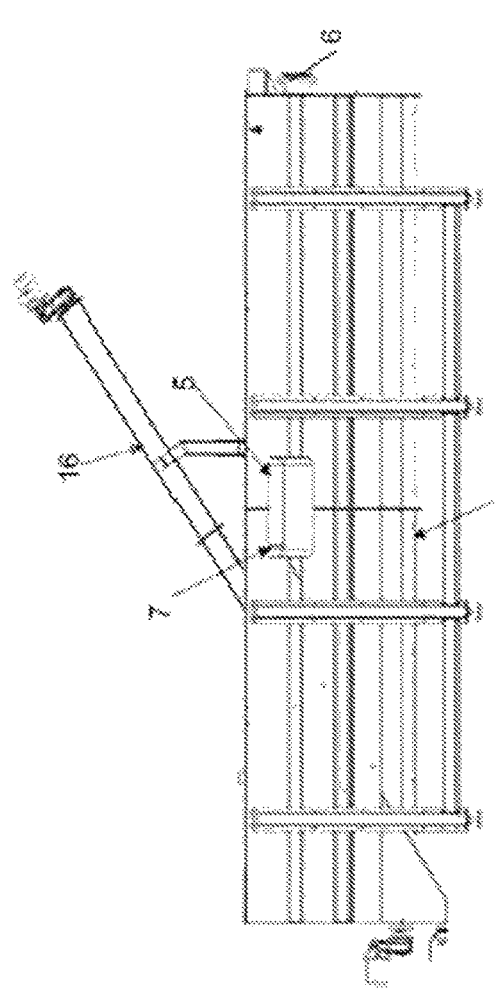
FIG. 8A shows a front view of the separation tank in accordance with some embodiments of the present disclosure.

Accordingly, the apparatus and method proposed by the present disclosure suggest introducing a contaminated liquid stream to the separation or sedimentation tank (400) to separate the heavy and floating contaminants from the liquid stream. FIG. 8A shows a perspective front view of the separation tank (400) in accordance with some embodiments of the present disclosure.

In an embodiment, the waste fluid or the liquid stream may comprise two types of contaminants, namely the heavy-weight solid contaminants and the light-weight plastic contaminants. In an embodiment, the heavy-weight contaminants may be drawn to the bottom of the separation tank (400) and the light-weight contaminants may be caused to float on the surface of the liquid. Essentially, the apparatus ensures that the floating light-weight contaminants are prevented from leaving the separation tank (400) through a discharge opening (6) shown in FIG. 8C, along with scum and with processed liquid.

Figure 8B:
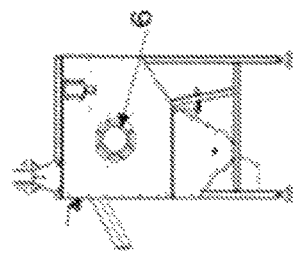
FIG. 8B shows the separation of the separation tank into two vessels using a baffle plate in accordance with some embodiments of the present disclosure.
Figure 8C:
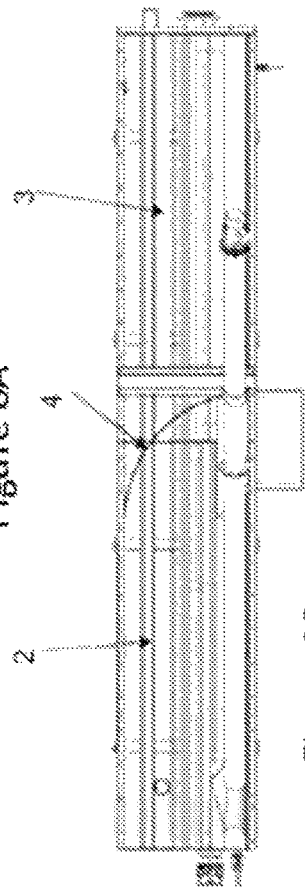
FIG. 8C shows a perspective sideview of the separation tank indicating a discharge opening of the separation tank in accordance with some embodiments of the present disclosure.

In an embodiment, as shown in FIG. 8B, the apparatus may be fitted with a vertical or slightly inclined baffle plate (4). The baffle plate (4) may be placed for example at about half the total length of the separation tank (4). Essentially, the baffle plate (4) may divide the separation tank (1) into two vessels, namely, a first vessel (2) and a second vessel (3). In an embodiment, the baffle plate (4) may not extend and/or reach the bottom of the separation tank (400), in order to ensure that the first vessel (2) and the second vessel (3) remain connected at the bottom of the separation tank (400). In addition to the baffle plate (4), the separation tank (400) may be provided with a rectangular opening (5) shown in FIG. 8A. As an example, but without limiting to, the rectangular opening (5) may have a dimension of 50 cm×15 cm. In an embodiment, the dimensions of the rectangular opening (5) may be decided based on the size of the separation tank (400) being used. Further, according to an exemplary implementation, the height (or the upper edge) of the baffle plate (4) may be maintained at a minimal of 5 cm higher than the lower part of the rectangular opening (5). The lower edge of the baffle plate (4) may be extended below the normal discharge level of the separation tank (400), thereby preventing any floating contaminants from transiting to the second vessel (3) of the tank (400).

In an embodiment, the rectangular opening (5) may be cut just below where the edge of the baffle plate (4) is perpendicularly attached to the sides of the separation tank (400). Further, the height of the rectangular opening (5) may be maintained just above the discharge opening (6) of the separation tank (400). The objective of this positioning is to ensure that the water level raises within the separation tank (400) when the discharge opening (6) is closed, such that the light-weight contaminants floating in the first vessel (2) can come out of the rectangular opening (5). In an implementation, the rectangular opening (5) may be provided with a sliding door (7) that makes the size of the rectangular opening (5) adjustable. Additionally, the sliding door (7) may be also used for varying the speed/velocity with which the excess liquid and the light-weight contaminants get evacuated from the separation tank (400).

In another embodiment of the present disclosure, the apparatus may further comprise a conveyor assembly (416) extending from a bottom of the separation tank (400) to a location outside of the separation tank (400), for evacuating the heavy-weight contaminants settled at the bottom of the separation tank (400) into the collection bin (390b).

In another embodiment of the present disclosure, the apparatus further comprises a collection tank (8), attached to the rectangular opening (5), such that the collection tank (8) collects the light-weight contaminants and excess liquid evacuated from the rectangular opening (5).

Figure 8D:
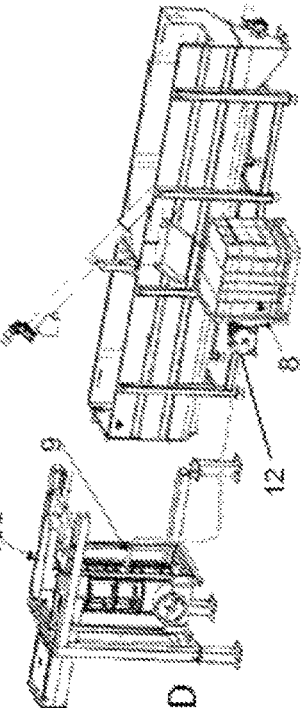
FIG. 8D shows perspective of the separation tank, the collection bin and the connection to the depackager in accordance with some embodiments of the present disclosure.

In another embodiment of the present disclosure, as displayed in FIG. 8D the collection tank (8) may be attached to a pump (12), such that the pump (12) sucks the scum, the plastic contaminants and the excess water collected in the collection tank (8) and pumps it back to the vertical depackager (100), e.g. at the feed inlet (118) positioned above the feed opening (114).

The sedimentation unit (400) is important to the plant because it removes the sand, the grit, the scum and the residual plastics prior to entering the digester and also has the ability to send the scum and the residual plastics to the depackager (100) for reprocessing. This cleans the plastics and expels them from the exit passage (128) at the top of the depackager (100) and forces the scum back into solution and expels the scum at the bottom of the depackager (100).

In various aspects a compact pre-treatment plant (300) is disclosed. The plant as shown in FIG. 1 includes a receiving hopper (301), an air roof (310), a vertical depackager (100), one or more dumpsters (390a), (390b) and a collection tank (8) and/or conveyors (391) and (396) and a sedimentation unit (400). The receiving hopper (301) is configured to receive the organic waste (203). In one embodiment the depackaging assembly (100) is the depackager assembly of FIG. 4 that may be installed either at the digester or composting plants or be used in the framework of decentralized pre-treatment practice, which is mostly used for larger municipalities and cities, for pre-treatment, separation, and treatment of the organic waste and/or biowaste. The organic biowaste may include, without limiting to, biodegradable garden and park waste, food and kitchen waste from households, restaurants, caterers and retail premises and comparable waste from food processing plants.

The plant (300) includes a receiving hopper (301), a vertical depackager (100), one or more dumpsters or conveyors (390) and a sedimentation unit (400). The hopper (301) is configured to receive the organic waste. In one embodiment to overcome the potential damage to the equipment the organics are pre-checked for metal wastes before loading into the hopper (301). In one embodiment the organics are shredded and are sent over a conveyor belt with magnets (227) to detect metal wastes. In a preferred embodiment a destacking and dosing device (200) as shown in FIG. 2 for dosed discharge of the food waste (203) from a storage container is included. The destacking and dosing device (200) includes metal sensors (227) that are installed in the hollow area below the ramp (226) preferably on the backside of said ramp installed. When a metal is detected, an alarm is generated to alert the operator in real time, and the metal can be removed prior to entry into the depackager (100). In some embodiments the plant comprises a grabber on an overhead crane to pick up the metal piece once located.

Figure 9:
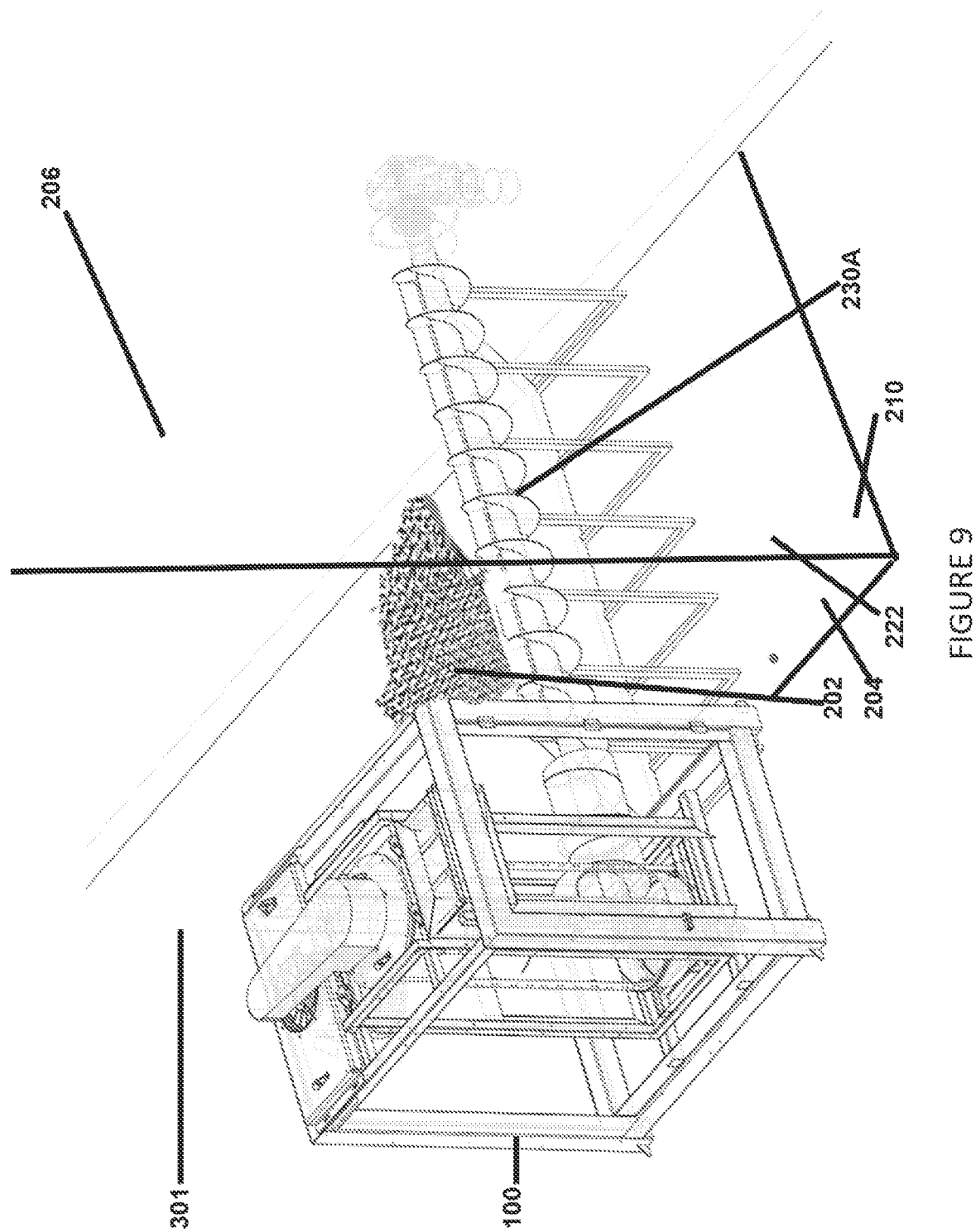
FIG. 9 illustrates the feeding screw connection from the hopper to the depackager in accordance with some embodiments of the present disclosure.

The vertical depackager (100) for depackaging the organic waste is sideways connected to the receiving hopper (301) through a feeding screw (230B) configured above the ramp (226) in the receiving hopper (301) as shown in FIG. 9. In various embodiments the vertical depackager (100) receives the food waste (102) via the screw conveyor (230B) and includes a stator assembly (110) placed concentrically with a rotor assembly (120). The stator assembly (110) includes a filtration drum (112) to hold the contaminated food waste (102). The contaminated food waste (102) is formed of the organic waste combined with liquids and air. The food waste (102) includes organic waste, light waste, liquids and air. In various embodiments the filtration drum (112) is perforated and is composed of a plurality of individual panels (116).

In various embodiments the plant (300) includes one or more dumpsters (390) for collecting the packaging removed by the vertical depackager (100). In various embodiments a sedimentation unit (400) is operationally connected to the depackaging assembly (100). In various embodiments the sedimentation unit (400) includes a tank (1) comprising a separator (4) configured to partly separate the tank into a first vessel (2) and a second vessel (3), wherein the first and the second vessels (2) and (3) are connected at the bottom through an opening, a rectangular opening (5) with a sliding door at a side of the tank (1) and above the edge of the separator configured to remove floating plastics, a conveyor unit (391) collects soup from the depackaging assembly (100) and introduces the soup to the sedimentation unit (400), wherein the sedimentation unit (400) processes and separates the soup into at least one of plastic waste, grit material and organic soup, wherein the plastic waste removed at the sedimentation unit (400) is collected at the receiving hopper (301) to be disposed of, reprocessed at the vertical depackager (100) or re-injected in the vertical depackager (100) at a level higher than the water level (118). The grit material removed at the sedimentation unit (400) is collected in a dumpster (390b) associated with the sedimentation unit (400) and the organic soup generated at the sedimentation unit (400) may be directly passed to an external sewer (392).

In various embodiments the organic soup generated by the sedimentation unit (400) or the depackager (100) is processed on site using a digester.

In various embodiments the organic soup generated by the sedimentation unit (400) or the depackager (100) is transported to a pumper truck.

In various embodiments the organic soup generated by the sedimentation unit (400) or the depackager (100) is diluted then sent to a sewer or a digestion unit for further processing In various embodiments an odour control arrangement (310) is attached with the hopper (301). This arrangement stops odour from spreading to a building from a hopper (301).

In some embodiments one or more air roofs are attached to the hopper (301).

In one embodiment the hopper (301) includes one or one or more air roof (310).

In various embodiments the receiving hopper (301) includes one or more screw conveyors (230a) and a top loader (200). In various embodiments the Waste Rover (200) moves the organic waste (203) received from one or more transport vehicles (201) to the feeding screw (230a) configured at the bottom of the receiving hopper (301).

The presence of a heated floor and an air roof (310) may be important to the conception of this plant. The collected food waste often arrives frozen, separating packaging from frozen goods is challenging. The frozen waste either comes from expired frozen food, often meats, or waste collection in the winter. Current practice is to let the waste thaw in large halls which can create harmful odours and require a lot of space. The use of a heated floor and the air roof, reduces the space requirement and eliminates the odour issue.

In another embodiment the temperature in the hopper is regulated to be as a minimum 2° C. difference with the ambient temperature in the building.

In various embodiments the receiving hopper (301) includes a heating mechanism to thaw the waste prior to being processed. The air roof (310), allows the heated floor to create a large temperature difference between the inside of the hopper and the building while only having to heat a much small volume of air in the hopper rather than heating the complete building. The air roof also stops the potentially harmful odours of thawing waste, often meat, to enter the building where employees are working. This allows for large energy savings in both heating and air treatment costs by replacing large open thawing halls.

In various embodiments the Waste Rover (200) moves the organic waste (203) received from one or more transport vehicles (201) to the feeding screw (230) configured at the bottom of the receiving hopper (301).

In various embodiments, multiple compact pre-treatment plants are located inside cites to collect and process the food waste at the source. These plants with odour control, a small space requirement, low operating costs and limited labour requirements, will help reduce the emissions from waste hauling activities when transporting waste from the source to the collection site typically located several kilometres out of the city. In some embodiments the produced soup from the centrally located plants may be sent to the sewer system where it can be transported free of emissions to the nearest wastewater treatment facility where the soup may be treated in an anaerobic digester to produce biogas.

In various embodiments, stormwater is used for the dilution water of the depackager (100), the resulting organic soup from the plant is then sent to the sewer system with the storm water for further processing.

In various embodiments the compact pre-treatment plant includes a destacking and dosing device (200) that includes one or more metal detectors (227) installed under the ramp (226) and configured to pre-check for metal wastes in the organic wastes. In one embodiment the compact pre-treatment plant comprises an air roof (310) attached to the hopper (301). In various embodiments the destacking and feeding device moves the organic waste received from one or more transport vehicles to the feeding screw conveyor (230) configured at the bottom of the receiving hopper. In various embodiments the receiving hopper directly feeds the organic waste to the vertical depackager through the feeder screw (230).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

While various aspects and embodiments have been disclosed herein, other aspects and embodiments will be apparent to those skilled in the art. The various aspects and embodiments disclosed herein are for purposes of illustration and are not intended to be limiting, with the true spirit being indicated by the claims.

We claim:

1. A storage hopper configured to receive a bulk material mass comprising:
    first and second side walls, and a bottom floor between the first and second side walls, defining an inner end and an outer end and an open top; an infeed at the inner end, and an outfeed at the outer end; and
    an air roof, comprising one or more air nozzle assemblies positioned with outlets facing in the direction of the open top such that air jets flowing out of the air nozzles are directed into the hopper through the open top from one or more directions at an angle;
    wherein the air roof is configured to block odours released from the storage hopper during loading of the bulk material mass at the infeed, as well as during discharging of said bulk material mass at the outfeed, and
    wherein an air roof blower suction is located inside a building and is used for complementing an HVAC system.

2. A destacking and dosing apparatus for dosed feeding of a bulk material mass in a hopper, the hopper comprising: first and second side walls, and a bottom floor between the first and second side walls, defining an inner end and an outer end and an open top; an infeed at the inner end; and an outfeed at the outer end, the destacking and dosing apparatus comprising:
    a carriage configured to move along an upper side of the first and second side walls;
    at least one gripper arm extending from the carriage, pivotally mounted at one end about a pivot axis extending transversely to the first and second side walls;
    a gripper element mounted on an outer free end of the at least one gripper arm extending between the first and second side walls, wherein the at least one gripper arm is configured to move the gripper element in a vertical direction,
    a feeding system configured to remove the bulk material mass from the hopper; and
    a ramp leading up to the feeding system;
    wherein the carriage is configured to move over a distance and the gripper arm has a length such that the gripper element is displaceable over a length of the hopper for moving and distributing the bulk material mass across the hopper and over the ramp to the feeding system.

3. The apparatus as claimed in claim 2, wherein a metal detector is installed behind a ramp and configured to detect metals in the bulk material mass, wherein the ramp leads up to a carrier device configured to remove waste from the hopper for feeding the waste to a depackager.

4. A vertical depackaging apparatus comprising:
    a stator assembly comprising:
        a filtration drum configured for receiving bulk material mass, the bulk material mass comprising organic waste, light waste, liquids, air and inerts;
        the filtration drum undulates to create a vibration force and dry the light-waste; and
        an input opening at a bottom of the filtration drum configured to receive the bulk material mass;
    a rotor assembly concentric with the stator assembly configured to rotate at a predetermined speed, the rotor assembly comprising:
        a central rotating shaft; and
        two or more vertical plates mounted substantially perpendicular to the central rotating shaft plus or minus 10 degrees at an upper end thereof, and configured to create a suction of air from the bulk material mass to a top of the stator assembly, thereby providing a lift force to remove the light waste;
    wherein a length of the vertical plates is at a minimum 12% of a height of the rotor assembly; and
    a plurality of bouncing plates mounted perpendicular to the central rotating shaft along a length and around a circumference of the central rotating shaft, each bouncing plate having an angle of inclination with respect to a surface of the central rotating shaft and having a predetermined clearance gap between the bouncing plates and the filtration drum,
    wherein the bouncing plates are configured to create a chaotic movement and expel air and light waste from the bulk material mass in the air environment and to lift to a surface of the bulk material mass the light waste therewithin, and simultaneously create a centrifugal movement at a top level of the apparatus to expel the light waste through an exit passage for the light waste at a top portion of the stator assembly; and
    wherein the organic waste and the inerts are expelled through a bottom part of the drum by gravity.

5. An apparatus for removing contaminants from a liquid stream, the apparatus comprising:
    a separation tank comprising:
        a discharge opening for evacuating a processed liquid stream from the separation tank;
        a baffle plate installed in the separation tank, wherein the baffle plate divides the separation tank into a first vessel and a second vessel,
        wherein the baffle plate is attached to sides of the separation tank, such that a lower edge of the baffle plate is at a height higher than a bottom of the separation tank, and such that the first vessel and the second vessel are connected below the baffle plate,
        wherein the baffle plate facilitates floating of the light-weight contaminants at the first vessel and causes heavy-weight contaminants to settle at the bottom of the separation tank;
    characterized in that:
    the separation tank further comprises a rectangular opening, cut at one side of the separation tank at a position where the baffle plate is attached to the side of the separation tank,
    wherein the height of the rectangular opening is higher than the discharge opening, such that light-weight contaminants floating at the first vessel evacuate through the rectangular opening when the discharge opening is closed, and
    wherein the rectangular opening comprises a sliding door for adjusting a width of the rectangular opening and to control velocity of the light-weight contaminants being evacuated from the rectangular opening.

6. An automatic pre-treatment plant comprising:
    a storage hopper configured to receive a bulk material mass comprising:
        at least two parallel opposite walls, the walls comprising inner ends and outer ends and comprising an infeed opening and outfeed opening between the corresponding outer ends of these walls configured to receive the mass on a bottom floor between the walls and the infeed and outfeed openings;

an air roof, composed of one or more air nozzle assemblies positioned with outlets facing in the direction of the opening such that core air jets flowing out of the air nozzle assembly are directed into the hopper through the opening from one or more directions at an angle °, wherein the air roof is configured to block odour released from the hopper during discharge of the bulk mass from a mass carrier device; as well as during loading of said material in a depackager, wherein a top opening of the hopper comprises dimensions that facilitate visual inspection of the mass in the hopper a destacking and dosing apparatus installed in the hopper for dosed feeding of the bulk material mass, comprising:

a carriage configured to move along an upper side of the walls and comprising at least one gripper arm provided at another end with a gripper element and suspended pivotally at one end round a pivot shaft extending transversely of the walls, wherein the gripper element is displaceable controllably in a vertical direction, and the carriage is displaceable over a distance and the gripper arm has a length such that the gripper element is displaceable over the entire length of the space bounded by the walls;

a vertical depackaging apparatus configured to simultaneously remove and clean light waste from the mass, comprising:

a conveyor positioned at a discharge end of the hopper and configured to remove mass from the hopper and feed mass to the depackaging apparatus;

a stator assembly comprising:
  a filtration drum to hold the mass, the mass comprising organic waste, light waste, liquids air and inerts;
  an inlet attached at a bottom position of the filtration drum and configured to receive the mass from the conveyor;
  a rotor assembly placed concentric with the stator assembly and configured to rotate at a predetermined speed, the rotor assembly comprising a central rotating shaft;
  two or more vertical plates mounted perpendicular to the shaft at a top position and configured to create a suction movement of air from the surface of the mass to a top of the apparatus thereby providing a lift force to remove the light waste; and
a plurality of bouncing plates placed perpendicular to the shaft along a circumference of the shaft, each bouncing plate having an angle of inclination with respect to a surface of the shaft and having a predetermined clearance gap between the bouncing plates and the filtration drum, wherein the bouncing plates are configured to create a chaotic movement and expel air and light waste from the mass in an air environment and to lift the light waste to a surface of the mass therewithin and simultaneously create a centrifugal movement at a top level of the apparatus to expel the light waste through an exit passage for the light waste at a top portion of the apparatus;

and wherein the organic waste and inerts are expelled through a bottom part of the filtration drum by gravity;

a conveyor configured to collect soup from the depackaging assembly; and a sedimentation unit operationally connected to the depackaging assembly such that the sedimentation unit is configured to receive the soup and processes the soup.

7. The plant as claimed as in claim 6, wherein the sedimentation unit is configured to receive the soup, processes, and separates the soup into at least one of plastic waste, grit material and organic soup, wherein the plastic waste is collected transported to the vertical depackager for reprocessing and the grit material is collected in a dumpster associated with the sedimentation unit.

8. The plant as claimed as in claim 6, wherein the sedimentation unit is configured to receive the soup and pass the soup to a digester or to a pumper truck or an external sewer.

9. The plant as claimed as in claim 6, wherein the sedimentation unit is configured to receive the soup and dilute the soup and send the diluted soup to a sewer for further processing.

10. The plant as claimed as in claim 6, wherein a small footprint biogas digester is installed to process the soup from the sedimentation unit.

11. The plant as claimed as in claim 6, wherein multiple plants are located inside cities to collect and process food waste at a source which will reduce emissions from waste hauling activities.

12. The plant as claimed as in claim 6, wherein a hopper designed to receive waste from a truck is fitted with a screw conveyor, positioned at a discharge end of the hopper, configured to simultaneously remove mass from the hopper and feed mass to the depackaging apparatus.

13. The plant as claimed as in claim 6, wherein the sedimentation unit is equipped with a transport system to re-feed scum and plastics to the depackager.

* * * * *